United States Patent
Detweiler

(10) Patent No.: US 6,210,043 B1
(45) Date of Patent: Apr. 3, 2001

(54) FLOAT CONTROL FOR PILLOW BLOCK BEARING

(75) Inventor: William H. Detweiler, Downingtown, PA (US)

(73) Assignee: SKF USA, Inc., York, PA (US)

(*) Notice: Subject to any disclaimer, the term of this patent is extended or adjusted under 35 U.S.C. 154(b) by 0 days.

(21) Appl. No.: 09/422,014

(22) Filed: Oct. 21, 1999

Related U.S. Application Data

(60) Provisional application No. 60/105,178, filed on Oct. 22, 1998.

(51) Int. Cl.[7] .................................................. F16C 25/06
(52) U.S. Cl. ........................... 384/519; 384/493; 384/557; 384/905
(58) Field of Search ................................ 384/537, 542, 384/519, 557, 562, 493, 905, 583–585, 247, 256, 278, 416, 419, 434

(56) References Cited

U.S. PATENT DOCUMENTS

| | | | |
|---|---|---|---|
| 2,430,487 | * 11/1947 | Wessenger | 384/557 X |
| 2,474,489 | * 6/1949 | Mortensen | 384/557 |
| 3,497,274 | * 2/1970 | Yardley | 384/583 |
| 3,516,352 | * 6/1970 | Lewis | 384/418 X |
| 3,807,819 | * 4/1974 | Zimmer et al. | 384/562 X |
| 4,626,111 | * 12/1986 | Swasey et al. | 384/557 X |

* cited by examiner

*Primary Examiner*—Thomas R. Hannon
(74) *Attorney, Agent, or Firm*—Eugene E. Renz, Jr., PC

(57) ABSTRACT

A support assembly comprising an elongated shaft, a bearing assembly at opposite terminal ends of said shaft paralleled in a pillow block, support means for each of said pillow blocks and means mounting one of said bearing assemblies for adjustable axial movement relative to said pillow block thereby to compensate for any changes in the support structure in an axial direction and a method for supporting a load bearing member on spaced support structures comprising the steps of mounting the lower half of a pillow block on each of the spaced support structures, positioning a shaft having bearings journaled at opposite ends so that the bearings engage in the lower half of the pillow block, assembling the cap section of each pillow block, fixing the bearing in one of the pillow blocks against displacement in an axial directions relative to the pillow block, and displacing the bearing in the other pillow block axially to position it generally centrally in the pillow block with a predetermined clearance between the bearing and the cover members.

1 Claim, 3 Drawing Sheets

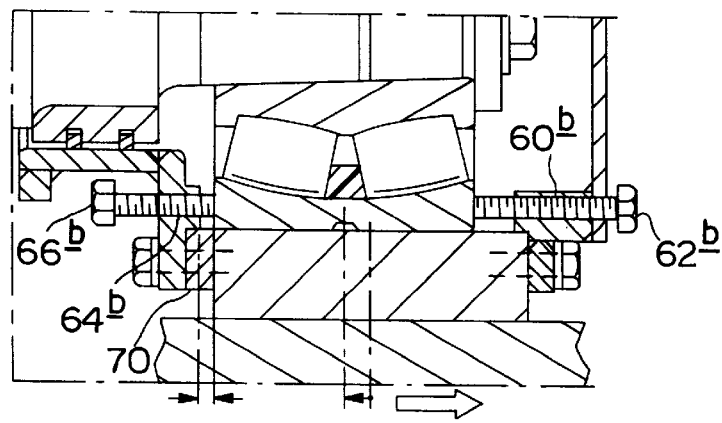
FIG. 4
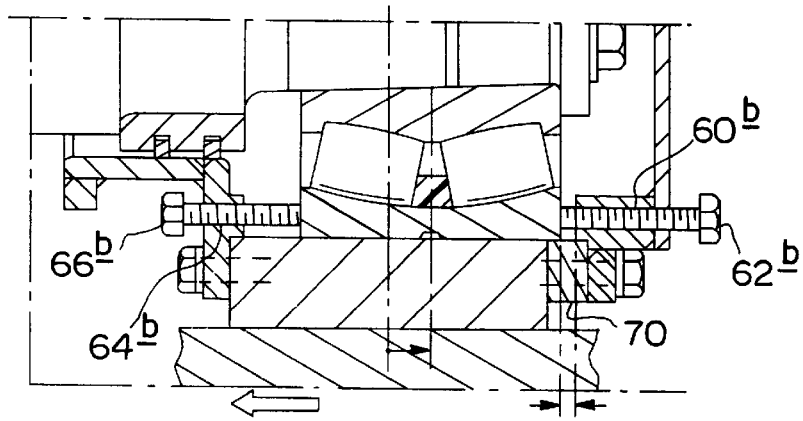
FIG. 5
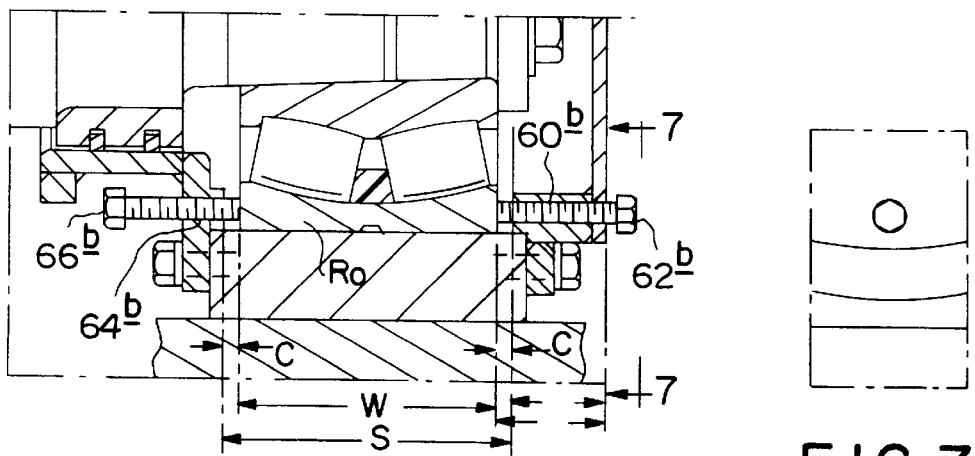
FIG. 6
FIG. 7

FLOAT CONTROL FOR PILLOW BLOCK BEARING

This application claims the benefit of U.S. Provisional Application No. 60/105,178 filed Oct. 22, 1998.

FIELD OF THE INVENTION

The present invention relates to improvements in systems and methods for installing supports for large structures such as bridges, involving bearings. Typically, these support structures include an elongated shaft for supporting the load rotatably journaled at its opposite ends in pillow blocks mounted on the bridge support structure.

SUMMARY OF THE INVENTION

The present invention is particularly adapted for mounting large bearings on structures such as bridges. More specifically, the present invention provides a system and method wherein two or more bearings are mounted on a shaft or rigid structure wherein one of the bearings is fixed and held in its housing so that the outer ring is constrained from movement in either direction parallel to the axis of rotation and the other bearing or bearings are floating; that is free to move back and forth parallel to the axis or rotation. This freedom of movement in the floating bearing is required in installations of this type to allow for changes in the shaft or the rigid structure to which the inner rings of the bearings are fixed or changes in the bridge foundation which supports the outer rings of the bearing which could produce a change in the distance between the bearings as measured parallel to the axis or rotation. These changes result from various conditions such as temperature which produces differences in thermal expansion rates between the shaft or rigid structure on which the bearing rings are mounted and the foundation on which the pillow blocks are mounted and variations in the loading of the shaft or rigid structure. The present invention provides a system involving a floating bearing to eliminate the possibility of very high thrust loads which could cause severe damage and compromise their ability to function properly in instances where the adjustments cannot be compensated for by a floating bearing arrangement.

BRIEF DESCRIPTION OF THE DRAWINGS

These and other objects of the present invention and various features and details of the operation and construction thereof are hereinafter more fully set forth with reference to the accompanying drawings, wherein:

FIG. 4 is a view similar to FIG. 6 but showing the shaft and floating bearing having undergone a major contraction that would normally bring the outer ring of the bearing into destructive contact with the inner face of the inner floating bearing housing and leaving no additional room for additional contraction. Normally, this condition would go unnoticed unless the bearing housing was disassembled. In the view shown, the position of the bearing within the housing has been measured through the inspection port, the inner end cover removed and a shim of desired thickness inserted between the housing block and the end cover plate restoring a floating bearing clearance between the inner cover end cover and the bearing.

FIG. 5 is a view similar to FIG. 6 but showing a condition wherein the shaft has expanded axially again bringing the inner bearing outer ring into destructive contact with the outer end cover of the floating bearing housing again the position of the bearing within the housing is easily determined through the inspection port without dismantling the bearing housing, the end cover removed and a shim of desired thickness added to restore a desired float clearance.

FIG. 6 is a fragmentary enlarged sectional view of the detail contained within the dot and dash outline of FIG. 1 and designated FIG. 4 showing details of the floating bearing housing of this invention. The housing is provided with means for quickly determining and maintaining float clearances without disassembly of the bearing housing or repositioning the housing on the pedestal. In the view shown, the bearing is shown positioned mid-way between the inner face end walls of the floating bearing housing having equal floating clearances on either side of the bearing for either contraction or expansion of the shaft due to temperature changes or loading differentials.

FIG. 7 is a fragmentary front elevational view taken on the line 7,7 of FIG. 6 showing one of the four plugged inspection and bearing positioning ports provided in the end covers of each float bearing housing.

DETAILED DESCRIPTION OF THE PREFERRED EMBODIMENT

Figure 1:
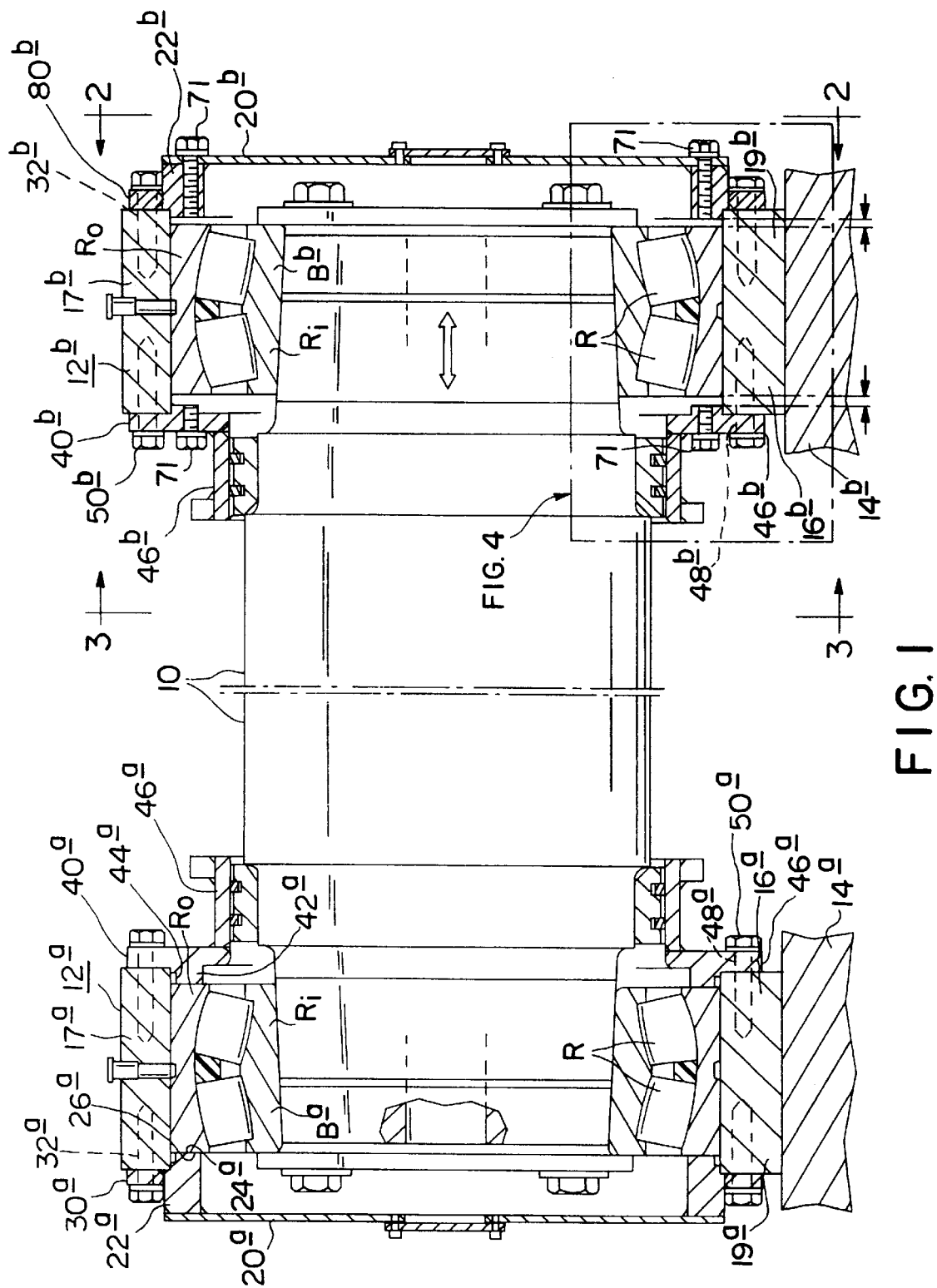
FIG. 1 is sectional elevational view at a reduced scale showing details of a shaft and bearing assembly such as utilized in bridge construction. The bearing assembly shown consists of a shaft supported in one fixed bearing and one floating bearing, the novel construction and design of the floating bearing housing being the subject of this invention.
Figure 2:
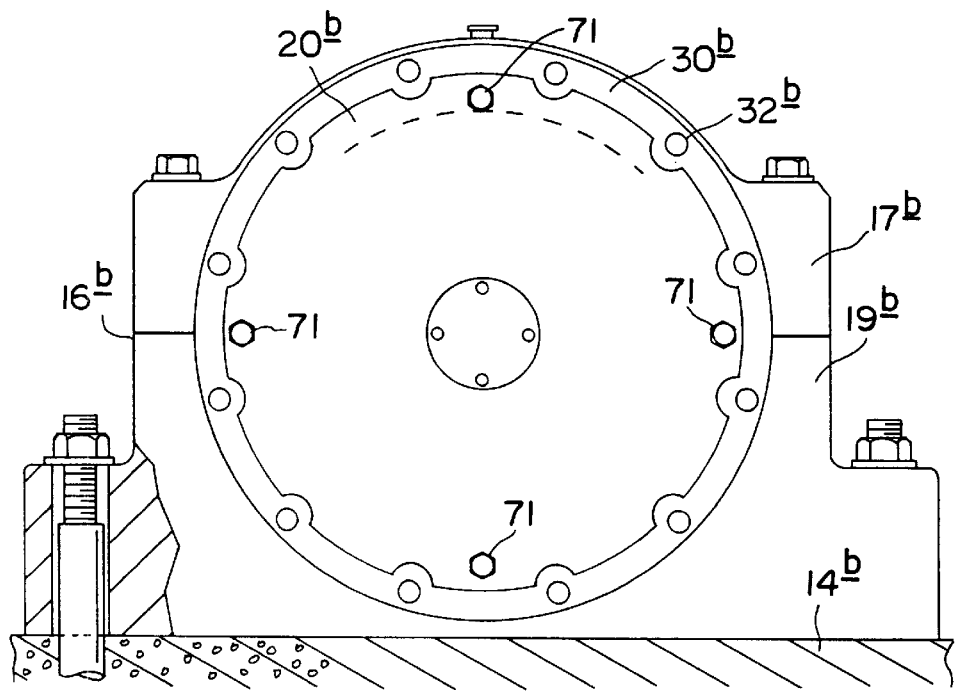
FIG. 2 is an end elevational view at a slightly reduced scale taken on the line 2,2 of FIG. 1 showing additional details of the floating bearing system of this invention.

Referring now to the drawings and more particularly FIGS. 1 and 2 thereof, there is provided a system for adjusting and measuring axial float in bearing pillow block assemblies. The invention involves a system of tapped holes in the face of the pillow block that provide access to the face of the bearing outer ring where float can be measured and adjusted. Specifically, in accordance with the present invention, there is provided access to the face of the bearing through a group of holes that have machined external surfaces surrounding the holes wherein the thickness of the end cover marked on the external surface and the use of these holes provide a means to adjust and measure float. Once the access is provided, then the end cover thickness must be accurately measured and stamped on the external surface so that the float can be measured. In prior systems, the end cover had to be removed to measure float and the pillow block was moved by pry bars or the like to adjust float. Once the bearing housing was in position and the load applied, then float was not measured or checked. In accordance with the present system, if the float is too small after assembly is complete, then gaskets can be inserted into the gap between the end cover and the housing to provided adequate float as required.

Considering now the invention more specifically, there is shown a system incorporating the float control bearing arrangement of the present invention. The system includes an elongated shaft (10) rotatably journaled at its opposite ends in pillow block assemblies ($12_a$, $12_b$). The pillow block assemblies are mounted on bridge pedestals ($14_a$, $14_b$). The major components of each pillow block are identical and therefore are marked with the same reference number differing only by the letter subscript. Thus, each pillow block includes a housing ($16_a$ and $16_b$) comprising an upper section or cap ($17_a$, $17_b$) and a lower section ($19_a$ and $19_b$). A double row spherical roller bearing ($B_a$, $B_b$) is mounted interiorly of the pillow block housing and includes the usual inner and outer rings ($R_i$, $R_o$) having confronting raceways and a plurality of spherical rollers (R) arranged in two rows in the annular space between the rings ($R_i$, $R_o$). Each pillow block assembly includes an outer generally disk-like end cover ($20_a$, $20_b$). Outer end covers ($20_a$, $20_b$) have circumferentially extending outer flange rings ($22_a$, $22_b$). The inner axial end face ($24_a$ and $24_b$) of the flange rings ($22_a$, $22_b$) confronts the outer axial end face ($26_a$) of the outer ring ($R_o$) of the spherical roller bearing assembly. Each flange ring ($22_a$, $22_b$) has a radially outwardly directed circumferentially extending flange ($30_a$, $30_b$) with a series of bolt holes ($32_a$, $32_b$) to mount the flange ring ($22_a$, $22_b$) and end covers to the pillow block in the manner shown.

The assembly further includes an inner end cover ($40_a$, $40_b$) of inverted "L"-shaped cross-section having an inner flange ring ($42_a$, $42_b$) confronting the inner axial end face ($44_a$, $44_b$) of the outer ring ($R_o$) of the bearing assembly and a radially directed outer flange portion ($46_a$, $46_b$) having a series of bolt holes ($48_a$, $48_b$) to accommodate bolts ($50_a$, $50_b$) for securing inner end cover ($40_a$, $40_b$) to the pillow block housing in the manner shown. In the case of the fixed bearing ring assembly ($B_a$), the inner and outer flange rings ($22_a$, $42_b$) are sized so that they abut and center the outer ring ($R_o$) of the bearing in the housing in the manner shown.

In the floating ring assembly ($12_b$), the space (S) between the confronting axial end faces of the inner and outer flange rings ($22_b$, $42_b$) is greater than the width (W) of the outer ring ($R_o$) of the bearing to provide clearance (C) in the manner shown so that the bearing assembly can "float" in the pillow block housing. In accordance with the present invention, the flange ring ($22_b$) has a series of circumferentially extending equi-spaced holes ($60_b$) for a series of jacking bolts ($62_b$) which threadedly engage in each of the holes ($60_b$) and can be activated to displace the pillow block housing and bearing axially relative to one another to create the bearing relative to the housing so that the space or clearance (C) on either side is approximately equal. The inner flange ring ($40_b$) likewise has a series of circumferentially equi-spaced axially extending holes ($64_b$) to accommodate a series of inner jacking bolts ($66_b$) to move the bearing and housing relative to one another in the opposite direction as indicated by the arrow in FIG. 5.

Referring now to the drawings, and particularly to FIG. 1 thereof, when two or more bearings are mounted on one shaft (10) or rigid structure then usually one bearing ($B_a$) is fixed, i.e. held by its housing so the outer ring ($R_o$) is constrained from movement in either direction parallel to the axis of rotation, and the other bearing or bearings ($B_b$) are floating, i.e. free to move back and forth parallel to the axis of rotation. This is illustrated in the attached drawing. This freedom of movement is required to allow for changes in the shaft or rigid structure to which the inner rings ($R_i$) of the bearings are fixed or changes in the bridge foundation ($14_a$, $14_b$) which supports the outer rings ($R_o$) of the bearings that result in a change in the distance between the bearings measured parallel to the axis of rotation. These changes can be caused by several factors including: changes in temperature and differences in thermal expansion rates between the shaft or rigid structure on which the bearing inner rings ($R_i$) are mounted and the foundation ($14_a$, $14_b$) on which the pillow blocks are mounted, and changes in the loading on the shaft (10) or rigid structure that occur as it rotates that change the distance between the bearings. If there is inadequate float on either side of a bearing then the bearings and the structure can be subjected to very high thrust loads that could cause severe damage and compromise their ability to function properly. In assembling bearings in large structures, and sometimes small structures, it can be difficult to move the components to assure that the floating bearing or bearings have freedom to move in both directions. Furthermore, after the complete structure is assembled and weight is applied to the bearings, it can be difficult to measure floats to assure that all floating bearings still have adequate freedom to move axially in both directions.

Consider now installation of a float control system incorporating the present invention. The attached drawings show two of the eight tapped holes ($60_b$, $64_b$) that were used. The shaft (10) had a complete bearing and housing assembly at each end with a fourteen foot diameter sheave mounted between them. A crane lifted the entire shaft assembly with both bearings and lowered it into position over the bridge pedestals. Jacking bolts ($62_b$, $66_b$) were turned into the float control holes ($60_b$, $64_b$) until they contacted the outer ring ($R_o$) of the bearing and then turned further to adjust the position of the housing. The housing could be lowered right over the pedestals and the bolts turned to achieve the exact position and float required. The jacking bolts were removed before the bearings were placed into position. After the housings were placed onto the pedestal, a scale was inserted into the holes to measure the depth from the face of the bearing outer ring ($R_o$) to the outside face of the housing end cover ($20_b$). During manufacturing of the housing end covers, the actual thickness of the end cover (including gaskets) at the float control holes ($60_b$, $64_b$) was measured and stamped onto the end cover (see FIG. 7). By subtracting the end cover value 3.1875 from the depth reading, the actual resultant float could be measured. After the housings were properly aligned with the pedestals and float was measured and found to be satisfactory, the float control holes were plugged with short bolts (71) that do not touch the bearing outer ring (see FIG. 1). Several days later, after the wire ropes were installed over the sheaves and the weight of about three million pounds was applied, the short bolts (71) were removed to measure float at all four float control holes ($60_b$, $64_b$) again to assure that there was still adequate float on both sides of both floating bearings and that float was even all around the bearing. The float had changed but was still ample so the holes were plugged again.

Figure 3:
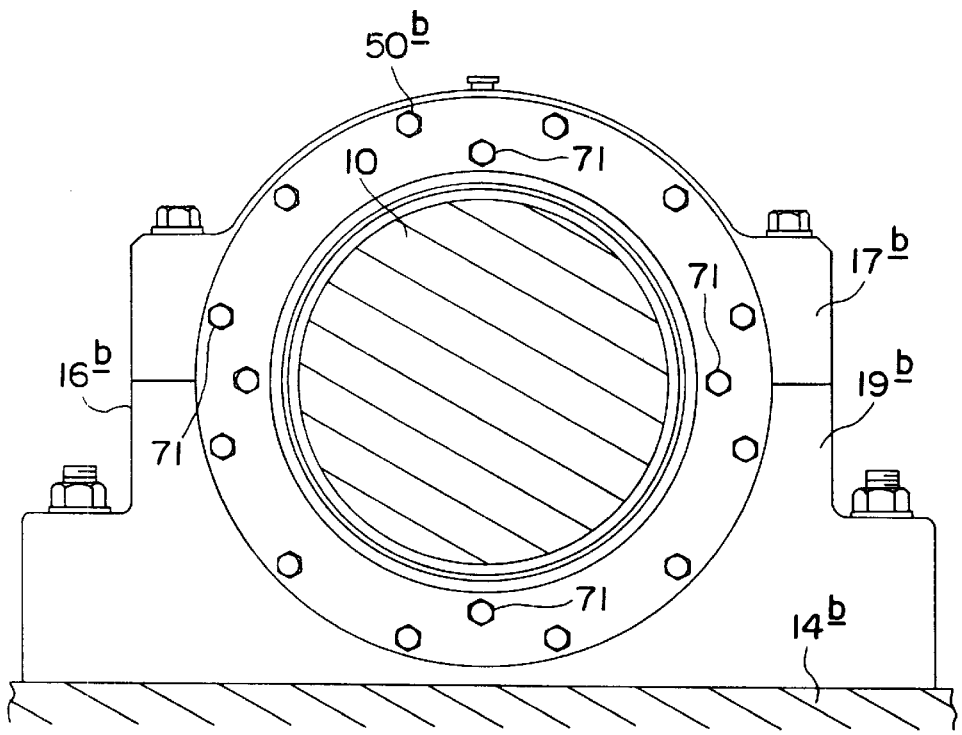
FIG. 3 is a sectional elevational view at a slightly reduced scale taken on the line 3,3 of FIG. 1 showing additional details of the inner face of the floating bearing housing.

Considering now installation of a floating bearing system in accordance with the present invention, and with particular reference to FIGS. 1–3, inclusive, the lower half ($19_a$, $19_b$) is first positioned on the bridge structure ($14_a$, $14_b$) and secured in place by bolts in the manner shown in FIGS. 2 and 3. The shaft (10) with the bearing assemblies ($B_a$, $B_b$) mounted at opposite terminal ends is then positioned in the bearings in the lower half of the pillow block ($19_a$ and $19_b$) already in place. The upper half or cap ($17_a$) and the fixed bearings and plates are then assembled as shown in the left-hand side of FIG. 1, so that the bearing is completely enclosed as shown. Jacking bolts ($62_b$, $66_b$) are then engaged in the bolt holes ($32_b$) of the end cover ($20_b$) in the floating bearing assembly ($B_b$) to displace the bearing relative to the pillow block until it is centered in the manner shown in FIG. 6. The jacking bolts ($62_b$, $66_b$) are then removed from the bolt holes and a depth micrometer is positioned in the bolt holes until it engages the outer ring ($R_o$) of the bearing and adjustment s are made until the clearance or C dimension on either side of the bearing are generally equal. Plug bolts (71) are then inserted into the bolt holes ($62_b$) to seal the bearing against the ingress of foreign particulate matter and moisture. Shims (70) maybe required in some installations to allow sufficient space for displacing the pillow block in instances where the pillow block lower half is not as precisely positioned as it should be. The use of shims is illustrated in FIGS. 4 and 5.

Even though particular embodiments of the present invention have been illustrated and described herein, it is not intended to limit the invention and changes and modifications may be made therein within the scope of the following claims.

What is claimed is:

1. A support assembly comprising an elongated shaft, a bearing assembly at opposite terminal ends of said shaft paralleled in a pillow block, support means for each of said pillow blocks and means mounting one of said bearing assemblies for adjustable axial movement relative to said pillow block thereby to compensate for any changes in the support structure in an axial direction.

* * * * *